United States Patent [19]
Anger et al.

[11] Patent Number: 5,810,121
[45] Date of Patent: Sep. 22, 1998

[54] MODULAR CALIPER

[75] Inventors: Stefan Ulrich Anger, Oxford; Bernhard Walter Kullmann, Rochester Hills, both of Mich.

[73] Assignee: ITT Automotive Inc., Auburn Hills, Mich.

[21] Appl. No.: 818,022

[22] Filed: Mar. 14, 1997

[51] Int. Cl.[6] ............................................. F16D 55/228
[52] U.S. Cl. .................. 188/72.5; 188/71.1; 188/73.45
[58] Field of Search ............................ 188/72.5, 73.45, 188/71.1, 72.4, 71.4, 370

[56] References Cited

U.S. PATENT DOCUMENTS

| | | | |
|---|---|---|---|
| 3,602,328 | 8/1971 | Fannin . | |
| 4,093,043 | 6/1978 | Smith | 188/72.5 X |
| 4,270,631 | 6/1981 | Kobelt . | |
| 4,485,896 | 12/1984 | Villata et al. | 188/72.5 |
| 4,505,363 | 3/1985 | Herbulot et al. | 188/72.5 |
| 5,477,944 | 12/1995 | Bryan et al. | 188/72.5 |

FOREIGN PATENT DOCUMENTS

| | | | |
|---|---|---|---|
| 2800300 | 7/1979 | Germany | 188/72.5 |

*Primary Examiner*—Robert J. Oberleitner
*Assistant Examiner*—Pamela J. Lipka
*Attorney, Agent, or Firm*—J. Gordon Lewis; Thomas N. Twomey

[57] ABSTRACT

A modular pin mounted caliper assembly is provided for use in a disc brake. The modular caliper assembly can be angled with one or more other modular caliper assemblies. Each caliper segment has a housing with a piston disposed in an inboard portion thereof for movement in an axial direction. A pair of flanges extend from opposite sides of the housing and are axially offset from each other enabling the connection and alignment of a plurality of segments. The resulting caliper can be used in a wide variety of vehicles despite changes in brake torque requirements. The modular caliper assembly includes a plurality of inboard and outboard brake shoe pairs. Each brake shoe has a pair of pin engaging features extending from opposite outboard ends of the brake shoe. Like the caliper segment flanges, the pin engaging features are axially offset from one another, enabling the shoes to be overlapped on common pins.

13 Claims, 3 Drawing Sheets

MODULAR CALIPER

TECHNICAL FIELD

The present invention relates to pin-mounted sliding caliper disc brakes used to apply braking torque to a wheel of a motor vehicle. More specifically, the invention relates to a modular caliper enabling the use of a single caliper design across a wide range of vehicles and vehicle braking requirements.

BACKGROUND OF THE INVENTION

Disc brakes for motor vehicles generally comprise a circular disc or rotor to which a wheel is mounted for rotation about a common axis. A non-rotating, rigid chassis member such as a knuckle or an axle has mounted thereon a bearing supporting the brake rotor and the wheel. The chassis member also provides support for a caliper which straddles a portion of the periphery of the rotor. In pin-mounted disc brakes, the caliper, and in some cases, the brake shoes, are supported by pins extending from the chassis member.

The caliper houses a piston on one side of the rotor. The piston is operative to urge one brake shoe lining into engagement with one side of the rotor, whereupon the portion of the caliper with the piston disposed therein is reactively pushed away from the rotor. This reaction brings the other brake shoe lining into engagement with the other side of the rotor and, hence, generates the desired braking torque.

Today's calipers are often customer and vehicle specific due to variations in required braking capabilities. For example, different calipers are frequently needed depending upon whether the caliper is to be used in a disc brake for the front axle of the vehicle or in a disc brake for the rear axle of a vehicle. Also, different calipers may be required for different disc or rotor diameters, as well as variations in vehicle mass and in axle loading. The requirement for individualized calipers often requires individual manufacturing equipment and increases both the cost of the caliper and the cost of disc brakes generally. These costs increase vehicle costs as well as repair costs because service facilities must spend more money to acquire and store multiple types of calipers.

Therefore, a need exists for an improved caliper that will minimize or eliminate one or more of the problems set forth above.

SUMMARY OF THE INVENTION

The present invention provides a modular caliper for use in a disc brake assembly. An object of the present invention is to provide a single caliper that can be used in a wide variety of vehicles despite variances in vehicle braking requirements.

A modular caliper segment in accordance with the present invention includes a segment housing and a pair of flanges extending from opposite sides of the segment housing. A first flange of the pair of flanges is axially offset by a distance from a second flange of the pair of flanges. In a preferred embodiment, the first and second flanges have oppositely facing co-planar surfaces.

A modular caliper in accordance with the present invention includes a first modular caliper segment having a first segment housing and a first pair of flanges extending from opposite sides of the first segment housing, a second modular caliper segment having a second segment housing and a second pair of flanges extending from opposite sides of the second segment housing, and a pin for connecting the first and second modular caliper segments. In a preferred embodiment of the present invention, the pin is slidably received in a cylindrical bore of first flange of the first segment housing and a cylindrical bore of a second flange of the second segment housing such that the flanges disposed over the pin are coaxially aligned. The first and second flanges of the housings are axially offset from each other such that outboard and inboard facing surfaces of the first and second flanges are co-planar. Because the flanges on each modular caliper segment are axially offset, any number of modular caliper segments can be connected together using additional pins. This allows a single caliper design to be used in a wide variety of vehicles despite changes in brake application requirements. For example, as the required braking torque is increased, additional modular caliper segments can be added to increase the braking torque on a vehicle wheel—without the necessity of designing and manufacturing a new caliper.

A disc brake assembly in accordance with the present invention includes a rotor rotatable about a first axis and having a first annular friction surface and an oppositely disposed second annular friction surface. The brake assembly also includes a plurality of parallel-spaced pins proximate to an outer edge of the rotor and extending generally parallel to the first axis. The brake assembly further includes a first brake shoe having a first friction pad located on one side thereof and having first and second pin engaging features proximate to outboard ends of the first brake shoe. The first friction pad is aligned with the first annular friction surface for engagement therewith. The first pin engaging feature is axially offset from the second pin engaging feature, and the first and second pin engaging features slidably receive a first pin and a second pin of the plurality of pins, respectively. The brake assembly also includes a second brake shoe having a second friction pad located on one side thereof and having its own first and second pin engaging features proximate to outboard ends of the second brake shoe. The second friction pad is aligned with the second annular friction surface for engagement therewith. The first pin engaging feature is axially offset from the second pin engaging feature, and the first and second pin engaging features slidably receive the second pin and the first pin, respectively. Finally, the brake assembly includes a first modular caliper segment having a first segment housing and a first pair of flanges extending from opposite sides of the housing. A first flange of the first pair of flanges is axially offset from a second flange of the first pair of flanges. The first flange slidably receives the first pin and the second flange slidably receives the second pin.

As stated hereinabove, because the flanges on each modular caliper segment are axially offset, any number of modular caliper segments can be connected together using additional pins. Similarly, because the pin engaging features on each brake shoe are axially offset, any number of inboard and outboard brake shoes pairs can be connected together using the same pins. Thus, a single caliper design can be used in a wide variety of vehicles despite changes in vehicle braking requirements.

These and other features and objects of this invention will be apparent to one skilled in the art from the following detailed description and the accompanying drawings illustrating features of the invention by way of example.

DETAILED DESCRIPTION OF THE PREFERRED EMBODIMENT

Figure 1:
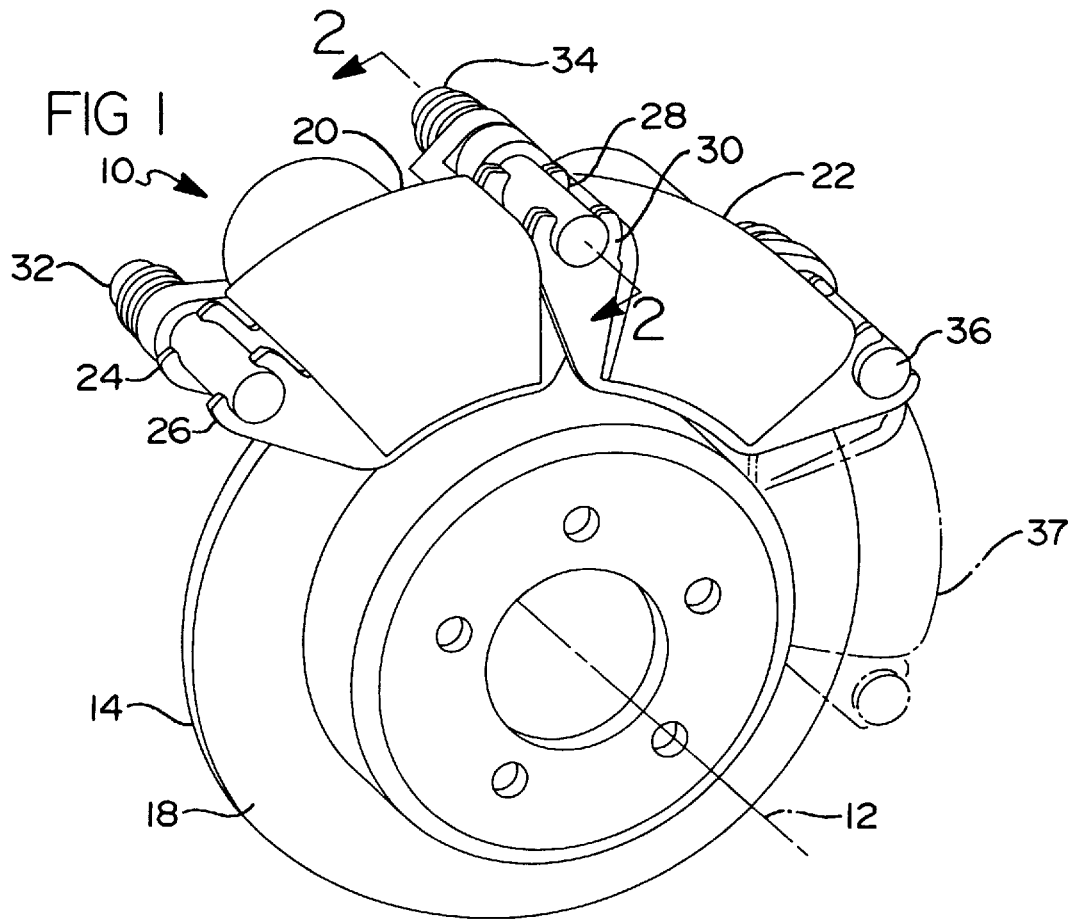
FIG. 1 is a perspective view of an exemplary caliper-type disc brake in accordance with the present invention.
Figure 2:
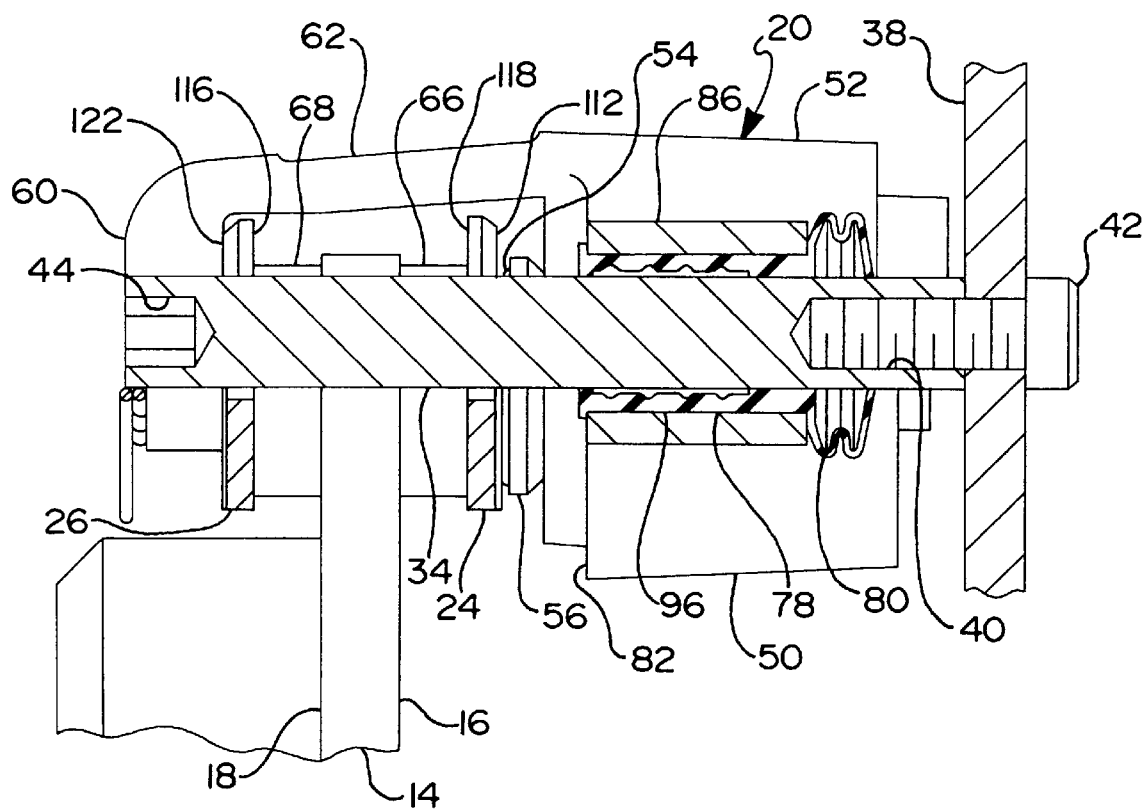
FIG. 2 is a partial view in cross-section of one modular caliper segment of the disc brake of FIG. 1 along line 2—2 thereof.

Referring now to the drawings wherein like reference numerals are used to identify identical components in the various views, FIG. 1 shows an exemplary sliding caliper disc brake assembly 10 for applying a braking torque to a wheel (not shown) of a motor vehicle rotating about a first axis 12. Brake assembly 10 includes a rotor 14 mounted to the wheel proximate to the wheel's hub. As seen in FIG. 2, rotor 14 has a first, inboard side defining an inboard annular friction surface 16 and a second, oppositely disposed, outboard side defining an outboard annular friction surface 18. Brake assembly 10 also includes identical first and second modular caliper segments 20, 22, each having inboard and outboard brake shoe pairs 24, 26 and 28, 30, and three hardened pins 32, 34, 36. Those skilled in art will recognize that brake assembly 10 could be constructed with only a single modular caliper segment, such as first segment 20, a single pair of brake shoes 24, 26, and two pins 32, 34. Yet alternatively, a third modular caliper segment 37 (shown in phantom in FIG. 1) could be employed with first and second segments 20, 22. For purposes of illustrating the present invention, however, two modular caliper segments have been shown in solid lines.

Pins 32, 34, and 36 are removably mounted on a non-rotating, stationary member of the vehicle chassis such as a suspension knuckle 38, shown schematically in FIG. 2. Pins 32, 34 slidably support caliper segment 20, and brake shoes 24, 26 to permit movement of shoes 24, 26 and caliper segment 20 in the direction of axis 12 (i.e. in a direction generally transverse relative to the rotational plane of the rotor 14). Pins 34, 36 similarly slidably support caliper segment 22 and brake shoes 28, 30. As seen in FIG. 2, each of pins 32, 34 and 36 may be mounted to knuckle 38 by threaded engagement of a threaded longitudinal bore 40 in a first end of each pin with a complementary male threaded fastener 42 threadably engaging and extending through knuckle 38. A second end of each pin preferably has a driving feature formed therein, for example, an Allen socket 44 within which to accept a suitable driving tool (not shown). Pins 32, 34 and 36 can be installed over fasteners 42 and suitably torqued for retention on knuckle 38 using the driving tool. Thus mounted, each of the plurality of pins extends in a direction generally parallel to rotational axis 12 of the wheel and rotor 14, and parallel to each other.

Figure 3:
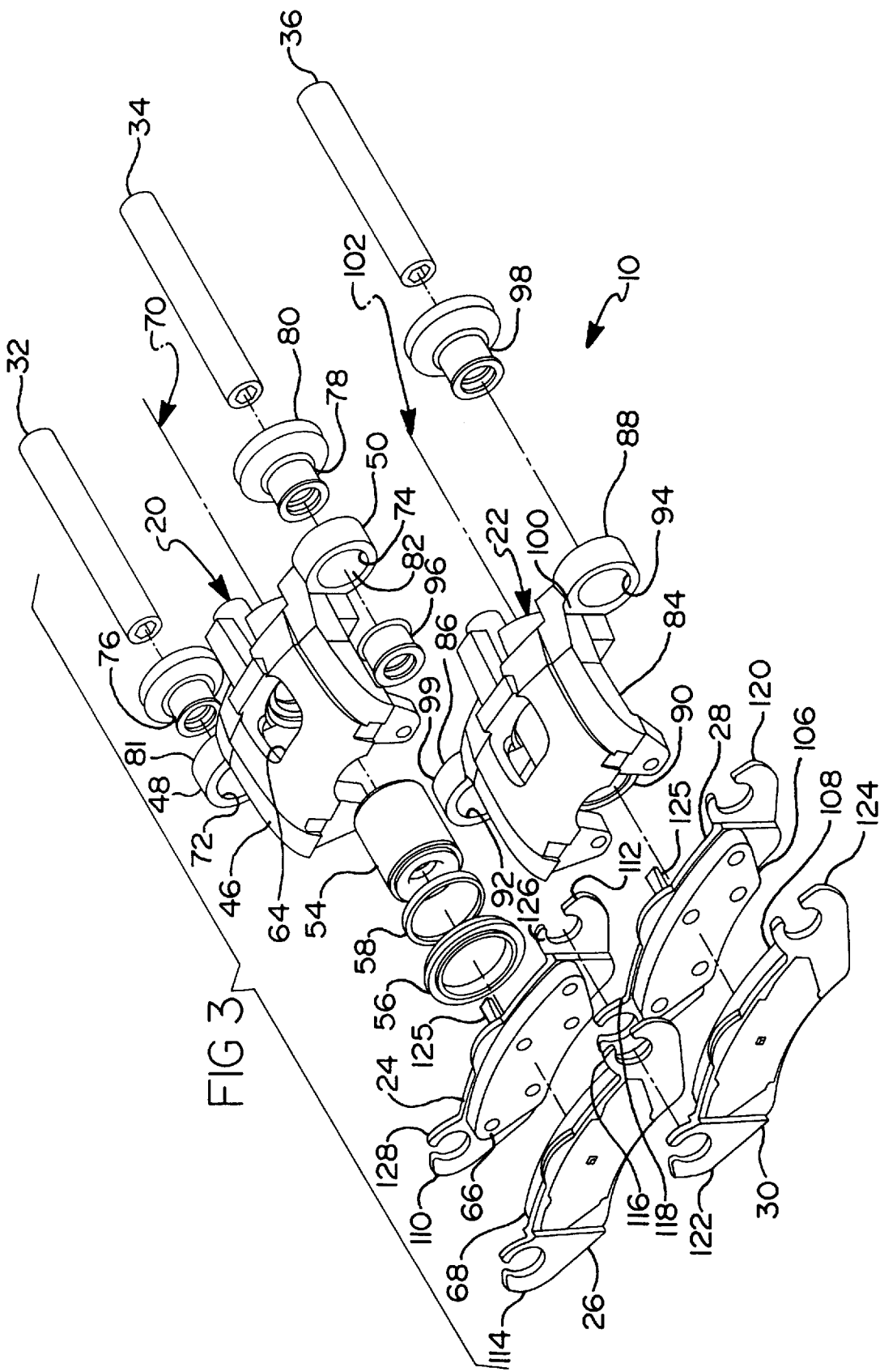
FIG. 3 is an exploded view in perspective of the disc brake of FIG. 1 (with the rotor having been removed for clarity)

Referring now to FIGS. 2 and 3, and with particular reference to first modular caliper segment 20, a modular caliper segment in accordance with the present invention may be described. As seen in FIG. 3, caliper segment 20 includes a caliper segment housing 46 having a pair of flanges 48, 50 extending from opposite sides of housing 46. As seen in FIG. 2, segment housing 46 includes a radially-inwardly extending, inboard portion 52 housing a hydraulic piston 54. Piston 54 has a protective dust boot 56 and seal 58. Segment housing 46 further includes a radially-inwardly extending outboard portion 60 with a finger area and a bridge portion 62 connecting inboard portion 52 and outboard portion 60. As seen in FIG. 3, bridge portion 62 may have a central aperture 64 formed therein to reduce the weight and providing a low profile which accommodates the internal contours of the wheel's inner rim (not shown). Bridge portion 62 straddles both a radially-outer edge of the rotor and inboard and outboard brake shoes 24 and 26. Each brake shoe 24, 26 has a brake lining or friction pad 66, 68 respectively, secured thereto suitable for repeated selective engagement with annular friction surfaces 16, 18, respectively.

As with other sliding caliper disc brakes, in operation, piston 54 is operated under hydraulic pressure to urge inboard brake shoe 24 and friction pad 66 into engagement with the inboard friction surface 16 of rotor 14 along an axis 70 extending through caliper segment 20 and substantially parallel to axis 12. Once inboard brake shoe 66 has engaged friction surface 16 of rotor 14, the continuing effort of hydraulic fluid against piston 54 will be in part exerted back upon inboard portion 52 of caliper segment 20. Caliper segment housing 46 as shown in FIG. 2 will thus be urged to the right displacing bridge portion 62 and the finger area of outboard portion 60 therewith to urge friction pad 68 of brake shoe 26 into engagement with outboard friction surface 18 of rotor 14. It should be appreciated that other actuating mechanisms, such as a motor driven screw, may be used in place of hydraulically actuated piston 54.

Returning to FIG. 3, flanges 48 and 50 each have a cylindrical bore 72, 74, respectively, extending therethrough, parallel to axis 70. Bores 72, 74 are sized to accept annular rubber bushings 76, 78. An inner diameter of each bushing 76, 78 is sized to slidably receive one of pins 32, 34, respectively, and a longitudinal extension of each bushing defines a dust boot 80. Flanges 48, 50 are axially offset so that an inboard facing surface 81 of flange 48 is co-planar with an outboard facing surface 82 of flange 50, with the planar surfaces 81 and 82 being normal to axis 70. Surfaces 81 and 82 could alteratively be hemispherical or oriented at an angle not normal to axis 70, but these surfaces would be more difficult to fabricate.

First caliper segment 20 can be connected to second caliper segment 22 to form a modular caliper. Second caliper segment 22 is identical to first caliper segment 20. The elements of second caliper segment 22 have been labeled with different reference numerals merely to distinguish them from the corresponding elements of first caliper segment 20 for purposes of discussion. Like caliper segment 20, caliper segment 22 has a segment housing 84 and a pair of flanges 86, 88 extending from opposite sides of housing 84. Housing 84 of segment 22 is similar to housing 46 of segment 20 and has a piston 90 housed within an inboard portion of housing 84 enabling segment 22 to selectively engage inboard and outboard brake shoes 28, 30. Flanges 86, 88 each have cylindrical bores 92, 94 sized to accept annular rubber bushings 96, 98, respectively. Flanges 86, 88 are axially offset so that an inboard facing surface 99 of flange 86 is co-planar with an outboard facing surface 100 of flange 88. An axis 102 along which piston 90 is displaced is generally parallel to axis 12.

Caliper segments 20, 22 have flanges 50 and 86 slidably disposed on a common pin 34, with flange 86 overlapping flange 50. Pin 34 is slidably received within bushing 78 of flange 50 and bushing 96 of flange 86. Pin 36 is slidably received by bushing 98. Additional caliper segments, such as caliper segment 37 can be joined in the same manner. Since pins 32, 34 and 36 are all parallel, caliper segments 20, 22 and 37 all move parallel to each other in the axial direction. The modular design enables the use of a single type of caliper in a wide variety of vehicles despite changes in traditional design parameters such as the diameter of rotor 14.

As mentioned hereinabove, disc brake assembly 10 includes a plurality of inboard and outboard brake shoe pairs, such as brake shoe pairs 24, 26 and 28, 30, in addition to a plurality of modular caliper segments, such as modular caliper segments 20 and 22. When segments 20 and 22 are joined together on pin 34, and outboard facing surface 82 is engaged by inboard facing surface 99, outboard portion 60 and inboard portion 52 of segment 20 are in alignment with outboard portion and inboard portion of segment 22. Also as mentioned hereinabove, each brake shoe has a friction pad such as pads 66, 68 of brake shoes 24, 26, respectively, and pads 106, 108 of brakes shoes 28, 30, respectively. Each of brake shoes 24, 26, 28 and 30 are identical to minimize the number of different parts in the brake system. Inboard brake shoes 24 and 28 each have a selectively mountable clip 125 to facilitate engagement of shoes 24 and 28 by pistons 54 and 90 respectively. Each brake shoe also has a pair of pin engaging features 110, 112 of brake shoe 24, pin engaging features 114, 116 of brake shoe 26, pin engaging features 118, 120 of brake shoe 28, and pin engaging features 122, 124 of brake shoe 30, disposed at opposite outboard ends of the respective brake shoe for slidably receiving pins 32, 34, 36. The pin engaging features shown substantially encircle their associated pins. Engaging features 110, 112 of first brake shoe 24 are axially offset so that an inboard surface 126 of engaging feature 110 is co-planar with an outboard surface 120 of engaging feature 112, with the planar surfaces 126 and 128 being normal to axis 70. The engaging features of each of the other brake shoes 26, 28 and 30 is similarly offset.

Figure 4:
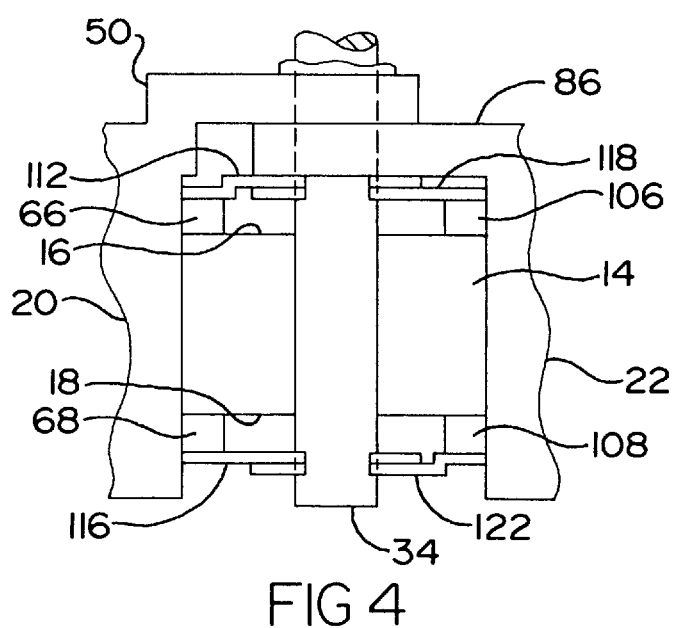
FIG. 4 is a top plan view of one of the pin mounts of the caliper-type disc brake of FIG. 1.

Because each pair of pin engaging features is axially offset, it is possible to overlap a pair of inboard brake shoes or outboard brake shoes on a common pin in the same manner as modular caliper segments 20, and 22 are overlapped. For example, as illustrated in FIGS. 3 and 4, pin engaging feature 112 of inboard brake shoe 24 and pin engaging feature 118 of inboard brake shoe 28 are both slidably disposed over pin 34. Pin engaging feature 116 of outboard brake shoe 26 and pin engaging feature 122 of outboard brake shoe 30 are also slidably disposed over pin 34. The axial offset of each pair of pin engaging features enables pin engaging features to overlap and yet provide co-planar alignment and simultaneous application of the respective friction pads of the inboard brake shoes and the outboard brake shoes. For example, the face of friction pad 66 of inboard brake shoe 24 and the face of friction pad 106 of inboard brake shoe 28 are co-planar when pin engaging feature 112 of brake shoe 24 is in facial contact with pin engaging feature 118 of brake shoe 28. Similarly, the face of friction pad 68 of outboard brake shoe 26 and the face of friction pad 108 of outboard brake shoe 30 are also co-planar when pin engaging feature 116 of brake shoe 26 is in facial contact with pin engaging feature 122 of brake shoe 30. This allows friction pads 66 and 106 to simultaneously, and evenly, engage friction surface 16 of rotor 14 and friction pads 68 and 108 to simultaneously, and evenly, engage friction surface 18 of rotor 14.

An inventive modular caliper and disc brake assembly have been provided which enable the use of a single caliper design in a wide range of vehicles despite changes in traditional design parameters. While the invention has been particularly shown and described with reference to the preferred embodiments thereof, it is well understood by those skilled in the art that various changes and modifications can be made in the invention without departing from the scope of the invention. For example, it should be readily apparent that the flanges could be positioned so that flange 50 overlapped flange 86. Similarly, the pin engaging features of the brake shoes could be reversed so that the shoes associated with segment 20 overlap the shoes of segment 22 instead of vice versa. Additionally, although the caliper housing segments are shown as unitary castings, they can potentially comprise multiple piece formings. Therefore, it is the appended claims which define the true scope of the invention.

We claim:

1. A modular disc brake caliper segment housing comprising:
   an inboard portion;
   an outboard portion spaced from and substantially parallel to the inboard portion;
   a bridge portion connecting the inboard portion and the outboard portion; and
   a pair of flanges extending from opposite sides of said inboard portion, each of the flanges having an aperture passing therethrough, wherein a first flange of said pair of flanges is axially offset with respect to a second flange of said pair of flanges such that a planar outboard facing surface of said first flange is in substantial alignment with an inboard facing surface of said second flange.

2. A modular brake caliper segment comprising:
   the housing of claim 1; and
   a piston housed within the inboard portion of said segment housing.

3. The modular brake caliper segment of claim 2, further including a bushing disposed within each of said apertures through said first flange and said second flange.

4. A modular disc brake caliper comprising:
   a first caliper segment housing having: a first inboard portion,
   a first outboard portion spaced from and substantially parallel to said first inboard portion,
   a first bridge portion connecting the first inboard portion and the first outboard portion, and
   a first pair of flanges extending from opposite sides of said inboard portion and each of said first pair of flanges having an aperture passing therethrough, wherein a first flange of said first pair of flanges is axially offset with respect to a second flange of said first pair of flanges such that an outboard facing surface of said first flange and an inboard facing surface of said second flange are in substantial alignment with each other;
   a second caliper segment housing similar to the first caliper segment housing having a corresponding second inboard portion, a second outboard portion, and a second bridge portion arranged substantially the same as the first caliper segment, said second caliper segment further including
   a second pair of flanges extending from opposite sides of said second inboard portion and each of said second pair of flanges having an aperture passing therethrough, wherein a third flange of said second pair of flanges is axially offset with respect to a fourth flange of said second pair of flanges such that an outboard facing surface of said third flange and an inboard facing surface of said fourth flange are in substantial alignment with each other,
   wherein the outboard facing surface of the first flange is disposed against the inboard facing surface of the fourth flange such that the inboard portion of the fourth flange and outboard portion of the first flange are in planar alignment with each other;

a first pin slidably disposed in the apertures through the first flange of the first housing and the aperture through the fourth flange of the second housing connecting said first modular caliper segment to said second modular caliper segment;

a second pin slidably disposed in the aperture through the second flange of the first housing; and a third pin slidably disposed in the aperture through the third flange of the second housing.

5. The modular caliper of claim 4, wherein said outboard facing surfaces and said inboard facing surfaces of both segment housings are co-planar.

6. The modular caliper of claim 4, further including a first piston housed within a first inboard portion of said first segment housing.

7. The modular caliper of claim 6, further including a second piston housed within a second inboard portion of said second segment housing.

8. The modular caliper of claim 4, further including a bushing located within each of the apertures passing through the flanges, with each bushing receiving the pin associated with the corresponding flange.

9. A disc brake assembly for selectively resisting the rotation of a wheel of a vehicle about an axis, said disc brake assembly adapted to be disposed between said wheel and a non-rotating, stationary member of said vehicle, said disc brake assembly comprising:

a rotor rotatable about a first axis having a first annular friction surface and an oppositely disposed second annular friction surface;

a plurality of parallel pins substantially parallel to said first axis and fixed in a location proximate to an outer edge of said rotor and the pins being equally spaced from each other;

a first brake shoe having a first friction pad located on one side thereof and having first and second pin engaging features proximate to outboard ends of said first brake shoe, wherein said first friction pad is aligned with said first annular friction surface for engagement therewith, said first pin engaging feature is axially offset with respect to said second pin engaging feature, and said first and second pin engaging features slidably receive a first pin of said plurality of pins and a second pin of said plurality of pins, respectively;

a second brake shoe having a second friction pad located on one side thereof and having third and fourth pin engaging features proximate to outboard ends of said second brake shoe, wherein said second friction pad is aligned with said second annular fiction surface for engagement therewith, said third pin engaging feature is axially offset with respect to said fourth pin engaging feature, and said third and fourth pin engaging features slidably receive said second pin and said first pin, respectively; and a first modular caliper segment housing having a first pair of flanges extending from opposite sides of said housing with a first flange of said first pair of flanges axially offset with respect to a second flange of said first pair of flanges, with the first flange slidably disposed over the first pin and a second flange disposed over the second pin.

10. The disc brake assembly of claim 9 wherein said first flange has an outboard facing surface substantially in alignment with an inboard facing surface of said second flange.

11. The disc brake assembly of claim 13 wherein said inboard and outboard facing surfaces of the third and fourth flanges, respectively, are in substantial alignment with each other.

12. The disc brake assembly of claim 10, further comprising:

a third brake show identical to the first brake shoe having a third friction pad located on one side thereof and having fifth and sixth pin engaging features proximate to outboard ends of said third brake shoe, wherein said third friction pad is aligned with said first annular friction surface for engagement therewith, said fifth pin engaging feature is axially offset with respect to said sixth pin engaging feature, and said sixth and fifth pin engaging features slidably receive said first pin and a third pin of said plurality of pins, respectively;

a fourth brake shoe identical to the second brake shoe having a fourth friction pad located on one side thereof and having seventh and eighth pin engaging features proximate to outboard ends of said fourth brake shoe, wherein said fourth friction pad is aligned with said second annular fiction surface for engagement therewith, said seventh pin engaging feature is axially offset with respect to said eighth pin engaging feature, and said eighth and seventh pin engaging features slidably receive said third pin and said first pin, respectively; and a second modular caliper segment housing and a second pair of flanges extending from opposite sides of said second segment housing with a third flange of said second pair of flanges axially offset with respect to a fourth flange of said second pair of flanges, with the fourth flange slidably disposed over the first pin and the third flange slidably disposed over the third pin.

13. The disc brake assembly of claim 12 wherein said third flange of said second housing has an outboard facing surface and said fourth flange of said second housing has an inboard facing surface, with said outboard facing surface of said first flange being in engagement with said inboard facing surface of said fourth flange.

* * * * *

UNITED STATES PATENT AND TRADEMARK OFFICE
CERTIFICATE OF CORRECTION

PATENT NO. : 5,810,121
DATED      : Sep. 22, 1998
INVENTOR(S) : Anger et al.

It is certified that error appears in the above-indentified patent and that said Letters Patent is hereby corrected as shown below:

Col. 8, line 20, the word "show" should be --shoe-- therefor.
Col. 8, line 35, the word "fiction" should be --friction-- therefor.

Signed and Sealed this

Eighth Day of June, 1999

Attest:

Q. TODD DICKINSON

Attesting Officer    Acting Commissioner of Patents and Trademarks